March 5, 1935.　　T. W. McCREARY　　1,993,412

GLASSWARE

Filed Jan. 18, 1934

INVENTOR
Thomas W. McCreary,
By Archworth Martin,
Attorney.

Patented Mar. 5, 1935

1,993,412

UNITED STATES PATENT OFFICE 1,993,412

GLASSWARE

Thomas W. McCreary, Monaca, Pa.

Application January 18, 1934, Serial No. 707,069

9 Claims. (Cl. 49—86)

My invention relates to reinforced glassware and a method of making the same and more particularly to that type of glassware containing metallic strands or wire mesh. While the invention is hereinafter described as employed in the manufacture of lamp globes or the like, it is susceptible of use also in connection with other glass articles.

One object of my invention is to provide an improved method of forming hollow glassware with a reinforcing mesh incorporated therein.

Another object of my invention is to provide a method of making glassware containing dead air spaces within the walls thereof.

Still another object of my invention is to provide a glass article that is not only reinforced against breakage, but one wherein the outer surface thereof is heat-insulated from the interior of the article.

Figure 1:
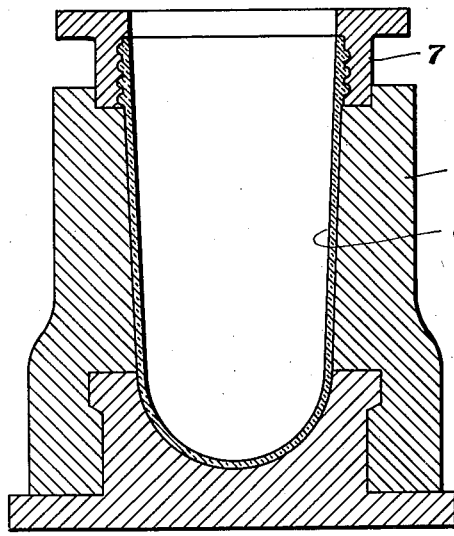
Figure 2:
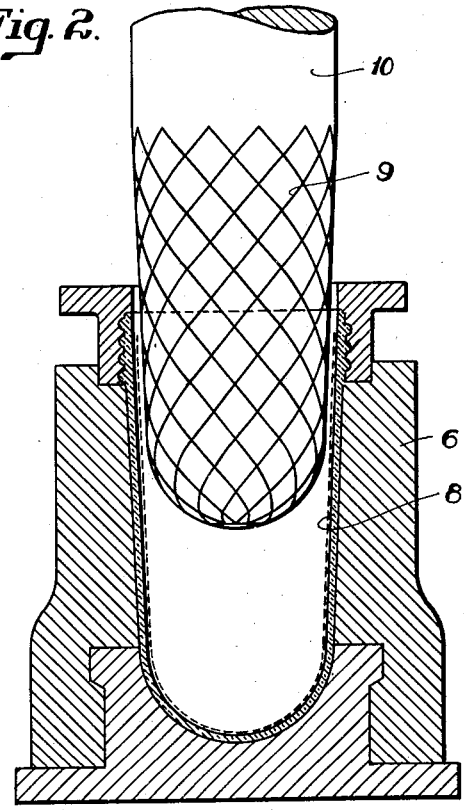
Figure 4:
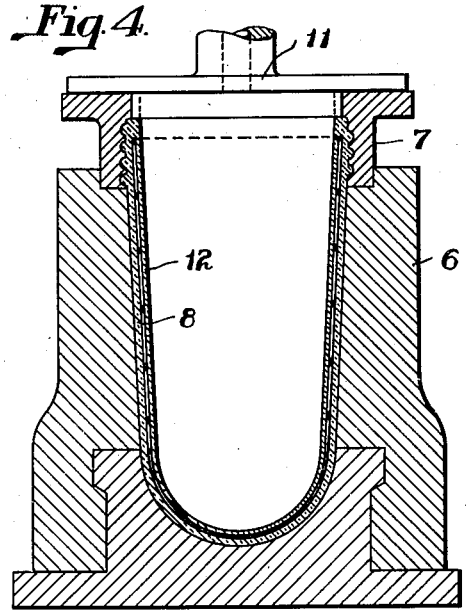
Figures 3, 5:
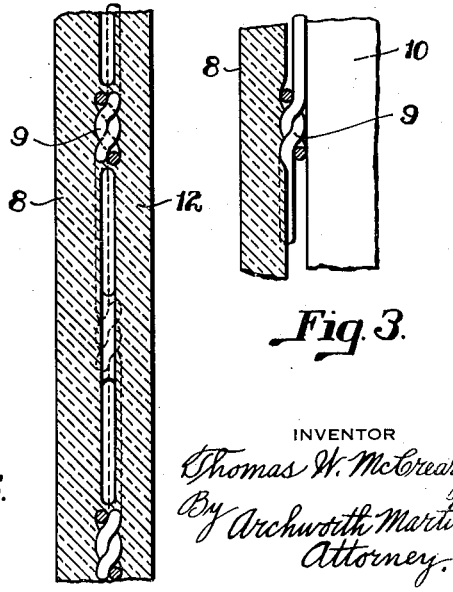

One manner in which my invention may be practiced is shown in the accompanying drawing, wherein Figure 1 is a sectional view, through a shaping mold, at a preliminary stage in the operation of forming a lamp globe therein; Fig. 2 is a view showing the step of inserting the wire reinforcement; Fig. 3 is a sectional view, on an enlarged scale, of a portion of the apparatus of Fig. 2; Fig. 4 is a sectional view showing the completed article within the mold, and Fig. 5 is an enlarged view of a portion of the structure of Fig. 4.

The numeral 6 represents a body mold, and the numeral 7 a neck mold or ring, both of which may be of forms well-known in the art. In the practice of my invention, I first introduce a charge of glass and expand the same, either by compressing or blowing, to form the outer shell 8 of the article to be produced. While the shell 8 is still in a plastic condition, I insert a wire mesh or netting 9 of basket-like form which conforms generally to the interior surface of the shell 8. The netting can conveniently be inserted by the use of a plunger 10, which is of such dimension that the wire strands of the basket 9 will be forced slightly into the inner side and bottom wall of the shell 8, and partially imbedded therein as shown in Fig. 3.

The plunger 10 is then removed, and a second charge of glass introduced into the mold. This second charge of glass is expanded, by the use of a blowhead 11 or otherwise, into contact with the basket 9, thereby forming an inner shell 12. The shell 12 is expanded to such degree that it partially imbeds the wire strands, but it is not expanded to such degree as will cause it to engage with and fuse to the inner wall of the shell 8 at all points. The shells 8 and 12 will be out of contact with one another at substantially all points between the various strands. Small dead air spaces are therefore present between the shells 8 and 12, which have the effect of retarding the transmission of heat from a lamp within a globe to the exterior surface thereof.

The uppermost edges of the shells are preferably fused together by contact of the shells while still plastic. The wire mesh extends into the neck or mouth portion of the globe so as to reinforce the same against breakage within a holder. Obviously, the imbedded mesh affords mechanical reinforcement to the globe to resist breakage thereof, and prevent fragments of glass from becoming dislodged in case of damage to the globe. Also the globe is highly resistant to thermal shock and is reinforced against breakage under sudden temperature changes over a wide range.

The air pockets serve the purpose of preventing the exterior surface of the globe from becoming very highly heated, so that in case of sudden chilling at the exterior of the globe, as by a current of air or drops of cold water, the glass is not so likely to crack.

If desired, the inner shell and the outer shell need not be of the same character of glass. For example, one of the shells could be formed of tinted glass.

I claim as my invention:—

1. The method which comprises shaping a hollow glass shell, introducing a wire mesh into said shell and into intimate contact with the inner wall thereof, and expanding a charge of glass in the said shell and against the exposed side of the said mesh, the expansion being limited to such extent that the glass of the charge will not have contact with the shell at points between the strands of said mesh.

2. The method which comprises shaping a hollow glass shell, introducing a wire mesh into said shell and partially imbedding the same therein, and expanding a charge of glass in the said shell and against the exposed side of the said mesh, the expansion being limited to such extent that the glass of the charge will not have contact with the shell at points between the strands of said mesh.

3. A glass article comprising an outer shell, an inner shell, and metallic strands disposed between said shells and having unitary relation therewith, the adjacent walls of the shells having contact with said strands, but lying in spaced relation to one another at points between the strands.

4. A glass article comprising an outer shell, an inner shell, and metallic strands disposed between said shells and having unitary relation therewith, the adjacent walls of the shells having contact with said strands, but lying in spaced relation to one another at points between the strands, the shells being fused together at their mouths.

5. A glass article comprising an outer shell, an inner shell formed unitarily with the outer shell, but spaced therefrom throughout the major portion of its area, and metallic strands partially embedded in each of said shells for dividing the space between the shells into a plurality of dead air spaces.

6. A glass article comprising an outer shell, an inner shell formed unitarily with the outer shell, but spaced therefrom throughout the major portion of its area, and a wire mesh having its strands partially embedded in each of said shells for dividing the space between the shells into a plurality of dead air spaces of small depth relative to the wall thickness of either shell.

7. The method which comprises positioning wire mesh between two layers of plastic glass, and applying sufficient pressure to the glass to cause the layers of glass to partially imbed the mesh therein, the pressure being limited to such extent that the layers of glass will not contact with each other at points between the strands of the mesh.

8. The method which comprises positioning wire mesh between two layers of plastic glass, and applying sufficient pressure to the glass to cause fusion of the layers of glass at the points of crossing of the strands of said mesh, the pressure being limited to such extent that the layers of glass will not contact with each other at points between the strands of the mesh.

9. The method which comprises depositing a wire mesh on one surface of a layer of plastic glass, applying a second layer of glass in a plastic condition against the mesh, and subjecting the glass to sufficient pressure to cause the glass to partially imbed the mesh and to fuse together at the points of intersection of the strands of the mesh, the pressure being limited to such extent that the layers of glass will not contact with each other at points between the strands of the mesh.

THOMAS W. McCREARY.